April 29, 1930.　　　　　J. ENGL ET AL　　　　　1,756,681
PROCESS AND APPARATUS FOR PHOTOGRAPHIC SOUND RECORDING AND REPRODUCING
Filed April 26, 1927
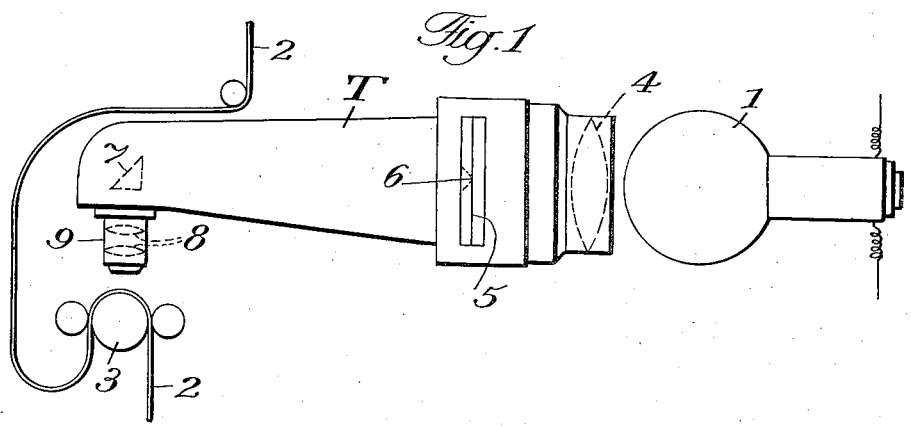
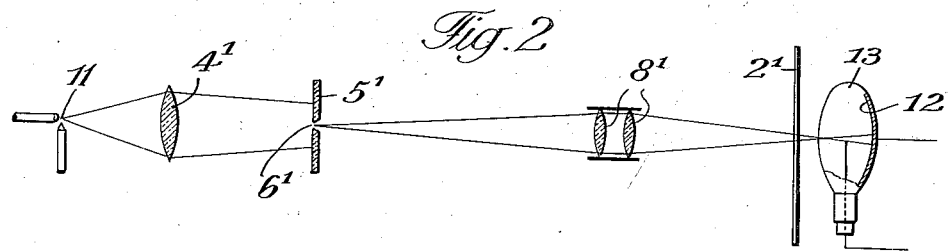
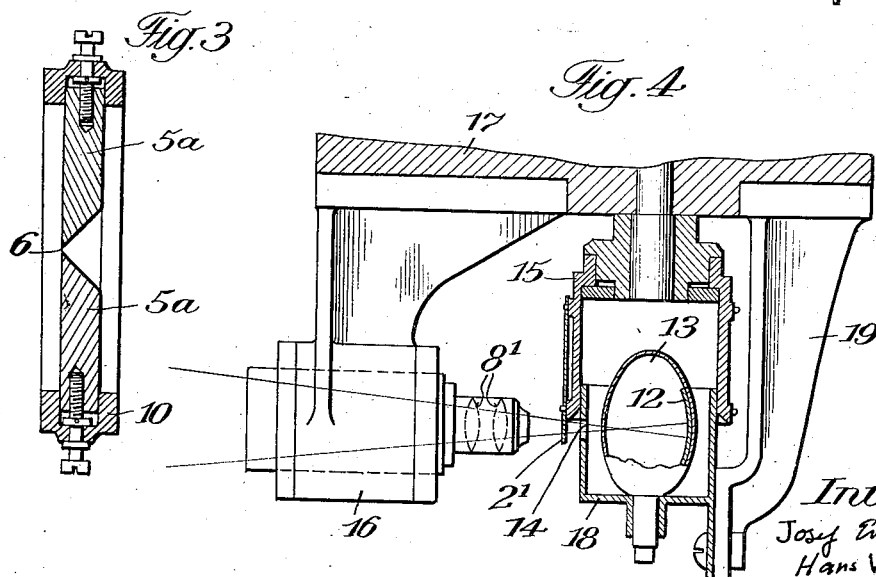
Inventor:
Josef Engl,
Hans Vogt,
Joseph Massolle,
by Ward, Crosby and Smith
their Attorneys Patented Apr. 29, 1930

1,756,681

UNITED STATES PATENT OFFICE

JOSEF ENGL, OF BERLIN-GRUNEWALD, HANS VOGT, OF BERLIN-WILMERSDORF, AND JOSEPH MASSOLLE, OF BERLIN-GRUNEWALD, GERMANY, ASSIGNORS, BY MESNE ASSIGNMENTS, TO WILLIAM FOX, OF WOODSBURGH, NEW YORK

PROCESS AND APPARATUS FOR PHOTOGRAPHIC SOUND RECORDING AND REPRODUCING.

Application filed April 26, 1927, Serial No. 186,658, and in Japan August 11, 1925.

The invention relates to a process and apparatus for photographic sound recording and reproducing. More particularly, it relates to an improved method and means for projecting light, in the form of an extremely narrow line having considerable intensity of illumination, upon a moving film or record carrier.

In recording sound, the sound waves are caused, by a microphone or the like, to set up acoustically-modulated electric currents in a circuit which includes the microphone. We cause these acoustically-modulated currents, which preferably are amplified, to modulate the intensity of illumination of a source of light so that preferably the intensity of illumination of this light source will vary in correspondence with the original sound waves which are to be recorded. Light from this source passes through a narrow slit and falls upon a moving sensitized film or the like whereon the sound record is made in the form of narrow lines extending transversely upon the film. The varying intensity of the recording light causes photographic blackening of the film of varying densities.

When the film has been developed and a positive film made therefrom, it is run at the same speed between a constant source of light and a light-sensitive element, such as a photoelectric cell. The varying quantities of light which pass through the film will set up currents in the circuit of the photo cell, which currents correspond to the variations of light impinging upon the photo cell, as is well known.

In accordance with the present invention, the slit through which the light passes, both in recording and in reproducing, is located at some distance from the moving film instead of being in close proximity thereto as is common. The slit, which is very accurately formed, is made sufficiently large so that a sufficient volume of light will pass therethrough. An image of the slit is then projected by a reducing microscopic system upon the film so that the line of light thus projected upon the moving film will be extremely narrow but very clearly defined.

We have found that the recording luminous line must have an extremely fine width in order to permit the individual recording of the various acoustic frequencies. Further, when the record is reproduced, the light must pass through each sound record line on the film, separately. If such precautions are not taken, the sound records of various high frequencies will overlap, in which case various characteristic sounds cannot be properly reproduced; further, if the sound records of various frequencies are separate and distinct from each other, reproduction of the same will be incorrect if the light which passes through the moving record onto the photo cell is projected in a band or line sufficiently wide to illuminate more than one record line at a time. We have found that these conditions cannot be practically fulfilled with the desired accuracy when the light passes through a fine slit closely adjacent to the film in the usual way, but that these conditions are admirably fulfilled by the method and apparatus disclosed and claimed herein.

Objects of the invention comprise the provision of improved methods of recording and reproducing sound and improved apparatus utilized in such methods in accordance with the foregoing.

Other objects consist in the provision of improved forms of construction and combinations of parts and steps of processes, all as will fully appear in the following specification and be particularly pointed out in the following claims.

In our copending application Ser. No. 51,074, filed August 18, 1925, Patent No. 1,650,166, dated November 22, 1927, (the claims of which are directed to a different invention), certain features of the invention here claimed are disclosed and this application is of the nature of a continuation of said copending application as to such features.

In order that the claims may be more fully understood attention is called to the accompanying drawings forming part of this application and illustrating certain forms of apparatus included within the invention and by which the novel method may be carried out.

In the drawings Fig. 1 is a diagrammatic side elevation of apparatus for photographically recording sound upon a moving film.

Fig. 2 is a diagrammatic view of apparatus used in the reproduction of sound from such records;

Fig. 3 is an enlarged section through the member in which the slit is formed; and Fig. 4 is a part sectional view of apparatus utilized in the sound reproduction, comprising the photoelectric cell, the moving film and means for mounting the reducing microscopic system used in connection therewith.

Referring first to Fig. 1, the source of illumination for making the records is indicated at 1. This is preferably an evacuated container, containing, however, a suitable gas, in which the passage of electric current between the anode and cathode of the device produces a luminous discharge. Whether the recording lamp be of this character or of another character, the intensity of the illumination emitted thereby is caused to vary in correspondence with electric currents feeding the lamp which in turn are caused to vary in correspondence with the sound which is to be recorded.

The sensitized film 2 is indicated as passing over a roller 3 which imparts to the film a uniform movement, at a desired rate, uniformity of movement of the film being essential at the point at which the records are to be made thereon, this point being in alignment with the axis of cylinder 3. If the film is utilized for also carrying motion picture records, it will, of course, have an intermittent motion at a different point at which the picture records are made thereon.

Light from source 1 passes through an illuminating system indicated by the lens 4 mounted in a tube T. Light passed by the illuminating system 4 falls upon a plate 5 in which is formed the slit 6. This slit is illuminated very intensively by the illuminating system 4, the slit being fully illuminated at all times during the operation of the device with light, the intensity of which is acoustically-modulated, as stated. The light which passes through slit 6 is refracted, in the form of apparatus indicated, by prism 7 which bends the beam of light through an angle of 90° into the plane in which the axis of cylinder 3 is situated. The light then passes through the reducing microscopic system indicated by the two lenses 8, 8 mounted in the angular extension 9 of the tube T. This microscopic system projects the image of slit 6 upon the moving film in the form of a luminous line of extremely narrow width. As the film progresses the luminous images thus projected thereupon will follow closely one after the other, these lines all being of equal length but varying in intensity of illumination as stated.

The use of the prism 7 for deflecting the beam of light at an angle to the axis of the tube T facilitates a compact and efficient arrangement of the apparatus in respect to the moving film 2. The light source 1, lens 4 and the slit 6 are preferably located in a somewhat spaced relation with respect to the moving film and at the same time it is convenient to carry the moving film on cylinders arranged as shown, such arrangement permitting the film to be properly advanced and yet securely held in alignment at the proper distance from the microscope at 8. Therefore the prism 7, by deflecting the beam of light at an angle, permits these limitations to be met, and makes possible a compact structural arrangement in which the optical parts are still accessible for adjustment, etc.

In regard to the width of the recording luminous line, the following conditions should be understood. The luminous line, as projected upon the film, must be so narrow that at a given speed of travel of the film the vibrations of the highest sound frequencies which are to be recorded will be recorded singly and separately. The maximum audible sound frequency lies in the neighborhood of 10,000 vibrations per second. If the film travels at a speed of 50 centimeters per second, when sound of a frequency of 10,000 per second is to be recorded, each vibration corresponds to the product of 50 divided by 10,000 or 1/200th of a centimeter of film. In other words, the recording luminous line must have a width less than 1/200ths of a centimeter in order that frequencies of 10,000 per second may be recorded individually. The faithful recording of such high frequencies is essential in order that truthful reproduction of the sound may be secured. This is so because a number of consonants which are very important for the proper intelligibility of speech, such as the sibilants, largely contain components of such high frequency. It is likewise known that the characteristic differences of sounds of similar pitch produced by different musical instruments, such as the violin and the flute, are due to different components of such high frequency oscillations. For these and other reasons it is of the utmost importance that these high frequency components of the sound should be faithfully recorded. Where the sound record is made upon a film, as at the edge of a moving picture film, the speed of the film is, of course, ordinarily determined by the standard speed of the picture film, which in commercial installations imposes practical limits upon the sound record speed of movement. If the film is run at a less rate than 50 centimeters per second, the width of space within which a separate record line must appear will, of course, be correspondingly less. The desirable speed of travel of the film is of course standardized and ordinarily determined in "talking" motion picture equipment by the requirements of the picture portion of the film. However, according to this invention faithful sound records may be made, even of sounds of high frequency, and reproduced, notwithstanding the conventional speed of travel of the film.

If the illumination of the film with such a narrow line of light be attempted by the provision of a slit of such narrow width closely adjacent to the film, various difficulties arise. It is difficult to form a slit having a width less than 1/200th of a centimeter with sufficient mechanical precision. Such a narrow slit is likewise liable to quickly become clogged with dust, etc., because of the passage of the film closely adjacent thereto. Moreover, it is difficult to project a sufficient volume of light through such a narrow slit.

These difficulties are eliminated by the present invention in which the slit 6 is made sufficiently wide so that there is little difficulty in making the same with exact parallel surfaces. The image of this slit is projected by the microscopic system 8 with sufficient reduction to produce the image of desired narrow width upon the film. The microscopic system 8 should be of a high grade and suitably corrected, in order that a perfectly plane image may be insured upon the film. It is evident that the difficulty referred to of having the slit clogged with dirt from the film is eliminated since the mere optical image of the slit which is projected upon the film can not of course, be soiled by the passage of the film.

The relative position of the elements of the system should be chosen in the following manner. The distance of the illuminating system 4 from the microscope 8 should be so chosen that the aperture of the objective 8 just permits the entire beam of rays to pass, that is the objective 8 is "entirely filled" with light, to use an expression of optics. The slit 6 is placed at such a distance from the microscope 8 that the image upon the film is sufficiently reduced in width as above explained. The aperture of the illuminating system 4 is chosen as large as feasible, in order that a maximum volume of light radiated by the source 1 may be embraced by the illuminating system. In the carrying out of the process the ratio of reduction of the width of the slit, as the reduced image is projected by the microscopic system upon the film, must be calculated with respect to the maximum frequency of sound to be recorded so that each sound vibration may be recorded by a distinct line separated from the adjacent lines.

The preferred manner in which the member, in which the slit is formed, is mounted, is indicated in Fig. 3. As there indicated, slit 6 may be provided between a pair of members formed of suitable material such as bronze, 5a, 5a, which are clamped in position between frame members 10, 10 and carefully adjusted in position by suitable screws or the like.

A similar system is used for reproducing purposes as is indicated in Fig. 2. In this case the source of light must be as constant as possible, this being indicated as an arc light 11. Light from this source passes through the illuminating system 4' and illuminates the slot 6' in a suitable member 5'. The light passing through the slot passes through the microscopic reducing system 8' whereby a reduced image of the slit is thrown upon the moving film 2', which may be considered as the positive formed from the sound negative 2. Varying intensities of light pass through the film according to the varying densities of the sound record formed on the film. The light which passes through the film falls upon the cathode 12 of a photoelectric cell 13 whereby an acoustically-modulated current is set up in a circuit including the terminals of the photoelectric cell, which current may be amplified and subsequently translated into sound by a suitable loud speaker or other sound reproducing device. The film 2' may be considered as moving at the same constant speed as did the film 2 at the recording of the sound and the same considerations, as above described, will apply to the location of the elements of the system, etc.

As indicated in Fig. 4 the photoelectric cell 13 may be mounted within a suitable light-tight enclosure, having an opening 14 therein through which the light which passes through film 2' will pass. The film is indicated as passing over a hollow cylinder 15 so that the light which is to fall upon the photo cell may pass unobstructedly through opening 14 in the casing of the cell. The microscopic system 8' may be mounted in a suitable housing 16 supported from the member 17 from which the photo cell enclosure 18 may also be supported, for example, by bracket 19.

While we have described our invention according to the preferred embodiments of the same, it will be obvious to those skilled in the art, after understanding the invention, that various alterations, modifications and substitutions may be made without departing from the scope of the invention and we aim in the appended claims to cover all such modifications.

We claim:

1. In apparatus for photographically recording sound on a moving film, the combination of a light source, the intensity of illumination of which is varied in correspondence with sounds to be recorded, optical means for producing a relatively wide band of light of high intensity from said source, a reducing microscope, an optical prism in the path of said band and spaced a substantial distance from said light band producing means for deflecting the light band through a substantial angle and through said microscope, means for continuously progressing a film past said prism and microscope and for maintaining a loop in the film in advance of the microscope, said loop embracing the zone of said prism, and means for supporting the moving film opposite the object glass of the microscope at a uniform predetermined distance therefrom whereby a reduced image of said band is projected on the film in the form of a fine line transverse to the direction of movement of the film.

2. Apparatus for photographically recording sound on a moving film comprising the combination of an angular tube having means at the end of one of its arms for producing a relatively wide band of light of high intensity, varied in correspondence with the sounds to be recorded, a reducing microscope in the other arm of the angular tube, an optical prism at the angle of the tube for deflecting said band of light through the microscope, and means for uniformly progressing a film past the object glass of the microscope.

JOSEF ENGL.
HANS VOGT.
JOSEPH MASSOLLE.